July 16, 1935.  E. NORDEN  2,008,107
PARACHUTE
Original Filed Aug. 8, 1932  2 Sheets-Sheet 1
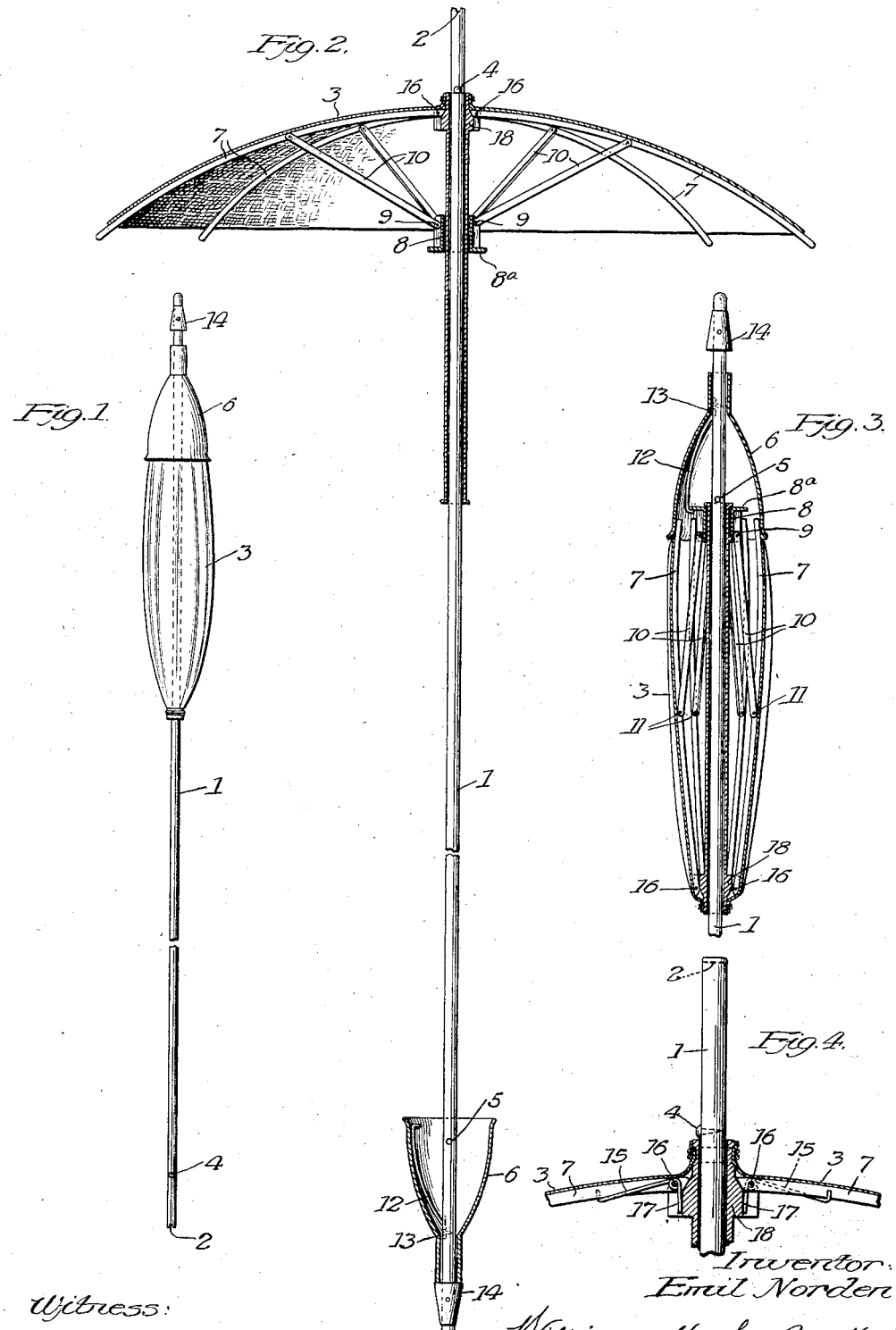
Witness:
R B Davison
Inventor
Emil Norden
By Wilkinson, Huxley, Byron Knight
Attys July 16, 1935.  E. NORDEN  2,008,107
PARACHUTE
Original Filed Aug. 8, 1932  2 Sheets-Sheet 2
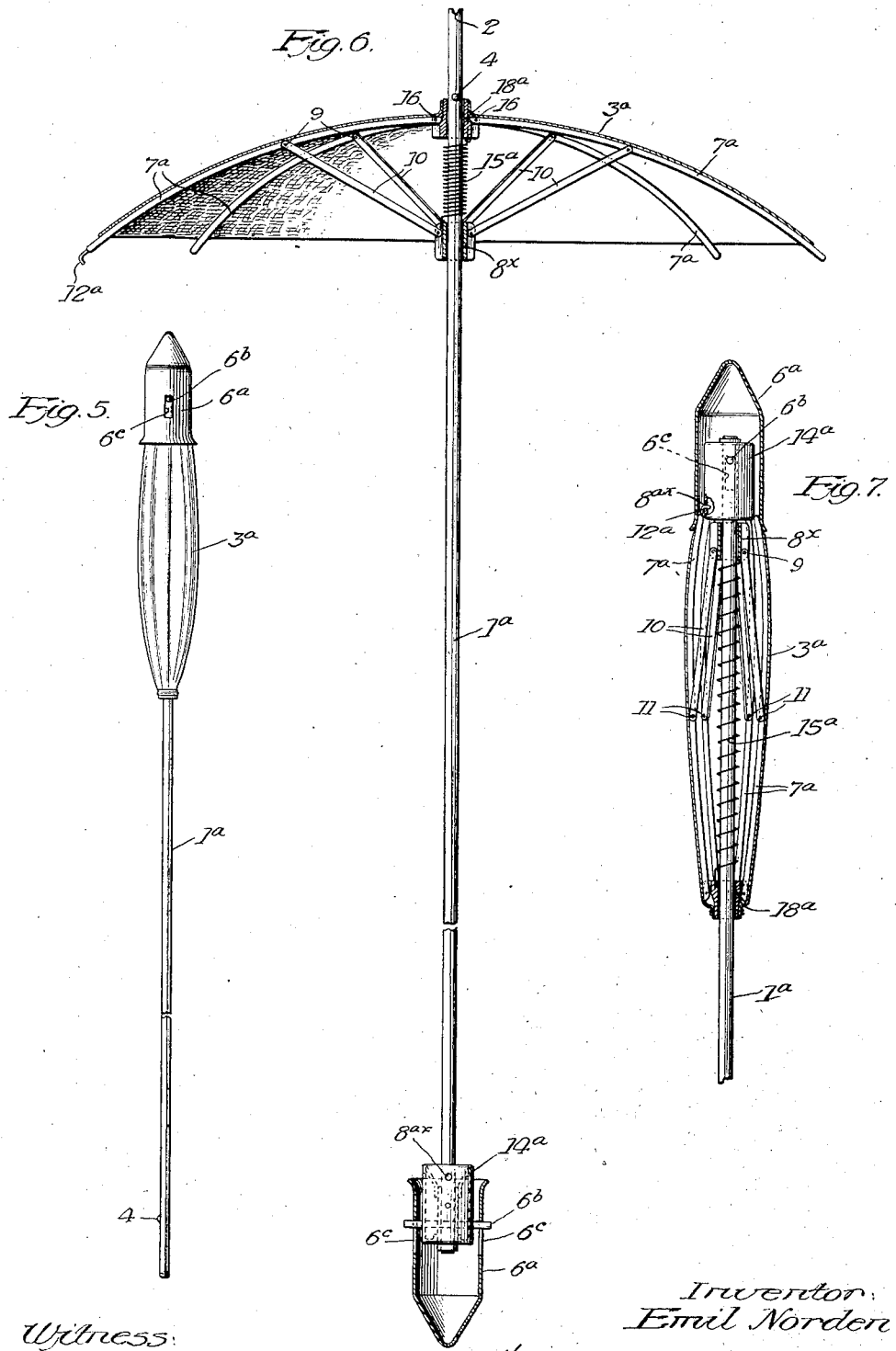
Inventor:
Emil Norden
By: Wilkinson, Huxley, Byron & Knight
Attys:
Witness:
R. B. Davison.

Patented July 16, 1935

2,008,107

UNITED STATES PATENT OFFICE 2,008,107

PARACHUTE

Emil Norden, Chicago, Ill., assignor of one-half to Hiram P. Tinslar, Chicago, Ill.

Application August 8, 1932, Serial No. 627,912
Renewed December 8, 1934

7 Claims. (Cl. 46—52)

The present invention relates to a parachute adapted to be delivered to and caused to function at a point remote from the place of delivery, and has for its object to provide a parachute in a form adapted for projection from a point of launching or discharge after the manner of a spear, arrow, or the like and which, when delivered in this manner, will automatically adjust itself to buoyant or parachuting condition.

The invention proceeds upon the principle of mounting upon a shaft simulating a spear or arrow, an air resisting element which is normally folded upon the shaft after the manner of an umbrella, but which will open and develop air resisting area after the device leaves the point of discharge, for instance, when it has reached the limit of its momentum and begins to descend under the influence of gravity. Another principle of the invention is in slidably mounting the parachute on its shaft so that it may serve first as a weight at the leading end of the shaft and then upon opening may slide to the trailing end of the shaft, which is then the upper end.

Other objects of the invention are to equip the shaft with means causing inversion of the device as a preliminary to spreading of the parachute, and to provide means normally holding the parachute folded, which automatically acts to release the latter at the proper time.

In the accompanying drawings, in which two embodiments of the invention are shown by way of illustration—

Figure 1 is an elevational view of one form of the device in folded condition and ready for launching.

Figure 2 is a view of the same showing the device in buoyant condition.

Figure 3 is a sectional view on an enlarged scale showing the relation of the elements when the parachute is folded.

Figure 4 is a detail view on an enlarged scale showing spreading springs for the ribs of the parachute; and Figures 5, 6 and 7 are views corresponding, respectively, to Figures 1, 2 and 3 and showing modifications in the self releasable retainer which holds the parachute folded and the resilient spreader for the ribs of the parachute.

Referring to Figures 1 to 4 inclusive, I represents a shaft which may be designed with an end notch 2 to adapt it to be projected as an arrow from a bow; 3 represents an umbrella parachute slidingly mounted upon shaft I, with a traverse defined by the stop pin 4 for one end and stop pin 5 for the other end; 6 represents a thimble or retainer which surrounds the free ends of the ribs 7 of the umbrella parachute to hold the latter folded during propulsion of the device to the point of action; 8a represents a flange on a runner 8 to which are pivoted at 9 the spreaders 10 which meet the ribs 7 at 11; and 12 is a spring detent pivoted at 13 to shaft I, adapted to interengage with flange 8a, biased in its resiliency to normally release said flange, but held in engagement with said flange by the thimble or retainer 6 whenever the latter is in position to embrace the free ends of the ribs 7. Retainer 6 has movement on the shaft I, one limit of which is the position shown in Figures 1 and 3 in which it embraces the ribs 7, while the other limit is established by the counterpoise and stop 14 to which the retainer moves when the device inverts its position at the end of its propulsion, and at which it remains during descent of the parachute as shown in Figure 2. As shown in Figure 4, ribs 7 are normally influenced in the direction of spreading by means of springs 15 fulcrumed on the pins 16 of said ribs and anchored at 17 against the slotted head 18 on which the ribs are mounted, so that whenever the retainer 6 moves out of embrace with the free ends of the ribs 7, the umbrella is immediately opened and the parachute is in position to function.

The operation of the embodiment shown in Figures 1 to 4 is as follows: With the device folded as in Figure 1, the shaft I is grasped and propelled after the manner of a spear, or it is introduced into a bow and propelled after the manner of an arrow, the retainer 6 being retained in embrace of the ribs 7 by the inertia of the retainer, and the parachute being prevented from sliding on shaft I by the detent 12 which is held in engagement with flange 8a by the retainer 6 which now overlies said detent. When momentum thus imparted to the device is dissipated, the device automatically reverses in the air by reason of the mass being greater at its upper end; retainer 6 gravitates away from the ribs 7; detent 12 springs out from flange 8a; springs 15 spread the ribs; the parachute slides on shaft I until arrested by stop 4, when the device will be in the condition shown in Figure 2 and its behavior will be that of an ordinary parachute.

According to Figures 5 to 7, parachute 3a is mounted to slide upon shaft Ia which carries a counterweight 14a upon which is mounted a retainer 6a with movement limited by cross pin 6b in slot 6c; the parachute is spread by means of helical tension spring 15a anchored at one end to the umbrella head 18a and at its other end to the runner 8x; and the detent 12a is mounted on one of the ribs 7a and adapted to engage in a recess 8ax of the counterweight 14a. When the device is propelled into the air as previously described, dissipation of its momentum results in inversion of its position, gravitation of retainer 6a, release of ribs 7a with unlatching of detent 8ax, opening of the parachute under the influence of tension spring 15a, and air-controlled gravitation to the ground.

As shown in Figure 4, the ribs 7, in addition to being pivoted at 16 upon the slotted head 18, abut at their inner pivoted ends against said head when the ribs are spread, thereby limiting the spreading movement of the ribs and rendering easily dispensable the spreaders 10 if, for the sake of reducing the weight of construction or economizing in production, omission of said spreaders is found to be desirable.

I claim:

1. A collapsible parachute having a shaft on which it is mounted and by means of which it is adapted to be propelled to a place from which it is desired to have it function, said parachute being slidable upon its shaft from a point near the end of the shaft which leads during propulsion to a point in the trailing end thereof, and which presents its hollow or air-resisting side toward said leading end; said leading end being counterbalanced to cause reversal of the shaft at the end of the propelling movement.

2. A collapsible parachute having a shaft on which it is mounted and by means of which it is adapted to be propelled to a place from which it is desired to have it function, said parachute being slidable upon its shaft and provided with a detent for resisting such sliding movement during propulsion, and means automatically releasing said detent at the end of propelling movement.

3. A collapsible parachute having a shaft on which it is mounted and by means of which it is adapted to be propelled to a place from which it is desired to have it function, said parachute being slidable upon its shaft and provided with a detent for resisting such sliding movement during propulsion, and means automatically releasing said detent at the end of propelling movement, comprising a retainer which embraces the parachute to hold it against spreading during propelling movement, but which is free to move out of retaining relation to the parachute and out of control of the detent at the end of said propelling movement.

4. An article of the class described comprising in combination, a shaft, a collapsible parachute slidably mounted on said shaft, means for securing said parachute adjacent the normally leading end of said shaft, said assembly with the parachute in its forward position having its weight so distributed that in falling the leading end of the shaft falls below the trailing end of the shaft, and means effective when said leading end is substantially below the other end for releasing said parachute from its then position on said shaft.

5. An article of the class described comprising in combination, a shaft, a collapsible parachute slidably mounted on said shaft, means for securing said parachute adjacent the normally leading end of said shaft and for holding said parachute collapsed, said assembly with the parachute in its forward position having its weight so distributed that in falling the leading end of the shaft falls below the trailing end of the shaft, said means being effective only when said leading end is substantially below the other end for releasing said parachute from its then position on said shaft and for releasing said parachute from its collapsed position to permit it to open.

6. An article of the class described comprising in combination, a shaft, a collapsible parachute slidably mounted on said shaft, means for securing said parachute adjacent the normally leading end of said shaft and for holding said parachute collapsed, said assembly with the parachute in its forward position having its weight so distributed that in falling the leading end of the shaft falls below the trailing end of the shaft, said means being effective only when said leading end is substantially below the other end for releasing said parachute from its then position on said shaft and for releasing said parachute from its collapsed position to permit it to open, said means and said parachute forming a substantially stream-lined body.

7. An article of the class described comprising a shaft, a parachute slidably mounted on said shaft and having a traverse which extends from a forward position well in advance of the normally trailing end of said shaft to a position near said trailing end of said shaft, said assembly with the parachute in its forward position having its weight so distributed that in falling the leading end of the shaft falls below the trailing end of the shaft.

EMIL NORDEN.